(12) United States Patent
Seaton

(10) Patent No.: US 9,555,968 B2
(45) Date of Patent: Jan. 31, 2017

(54) APPARATUS FOR FACILITATING ROOFING DEBRIS REMOVAL

(71) Applicant: Scott Seaton, Omaha, NE (US)

(72) Inventor: Scott Seaton, Omaha, NE (US)

( * ) Notice: Subject to any disclaimer, the term of this patent is extended or adjusted under 35 U.S.C. 154(b) by 0 days.

(21) Appl. No.: 14/819,224

(22) Filed: Aug. 5, 2015

(65) Prior Publication Data

US 2016/0039606 A1     Feb. 11, 2016

Related U.S. Application Data

(60) Provisional application No. 62/033,881, filed on Aug. 6, 2014.

(51) Int. Cl.
*B65G 11/12* (2006.01)
*B65G 11/14* (2006.01)

(52) U.S. Cl.
CPC ........... *B65G 11/146* (2013.01); *B65G 11/126* (2013.01)

(58) Field of Classification Search
CPC ....... B65G 11/14; B65G 11/12; B65G 11/143; B65G 11/146; B65G 11/123; B65G 11/126
USPC ....................................................... 193/6, 30
See application file for complete search history.

(56) References Cited

U.S. PATENT DOCUMENTS

| | | | | | |
|---|---|---|---|---|---|
| 2,968,382 | A | * | 1/1961 | Oury | B28C 5/4251 193/10 |
| 3,168,946 | A | * | 2/1965 | Gay | B65G 11/146 193/6 |
| 3,744,741 | A | * | 7/1973 | Christian | A63H 27/001 244/16 |
| 4,577,725 | A | * | 3/1986 | Hunter | A62B 1/20 182/2.11 |
| 4,711,334 | A | * | 12/1987 | Barry | B28C 5/4251 193/10 |
| 5,178,252 | A | * | 1/1993 | Smith | B28C 5/4251 193/16 |
| 6,041,907 | A | * | 3/2000 | Bonnette | B28C 5/4251 193/10 |
| 6,186,304 | B1 | * | 2/2001 | Håkansson | B28C 5/4251 193/25 A |
| 8,733,533 | B1 | * | 5/2014 | Duran | B65G 41/002 198/316.1 |

FOREIGN PATENT DOCUMENTS

DE      EP 0173182 A1 *  3/1986 ........... B65G 11/126
DE      EP 0201847 A2 * 11/1986 ........... B65G 11/083

OTHER PUBLICATIONS

Espacenet, "Patent Translate of EP 0 201 847", 2016.*
Espacenet, "Patent Translate of EP 0 173 182", 2016.*

* cited by examiner

*Primary Examiner* — Mark A Deuble
(74) *Attorney, Agent, or Firm* — Baird Holm LLP; AriAnna C. Goldstein

(57) ABSTRACT

An apparatus is disclosed for facilitating removal of debris from the roof of a construction location or other raised work site. The apparatus comprises a chute comprising multiple sections that may telescope to extend in length, where the chute is configured for implementation with a mobile platform.

18 Claims, 8 Drawing Sheets

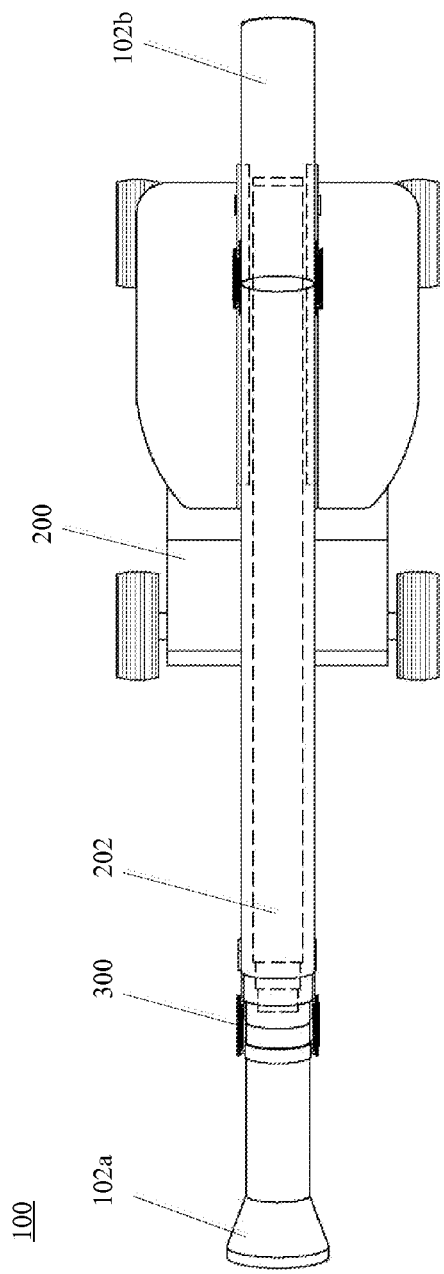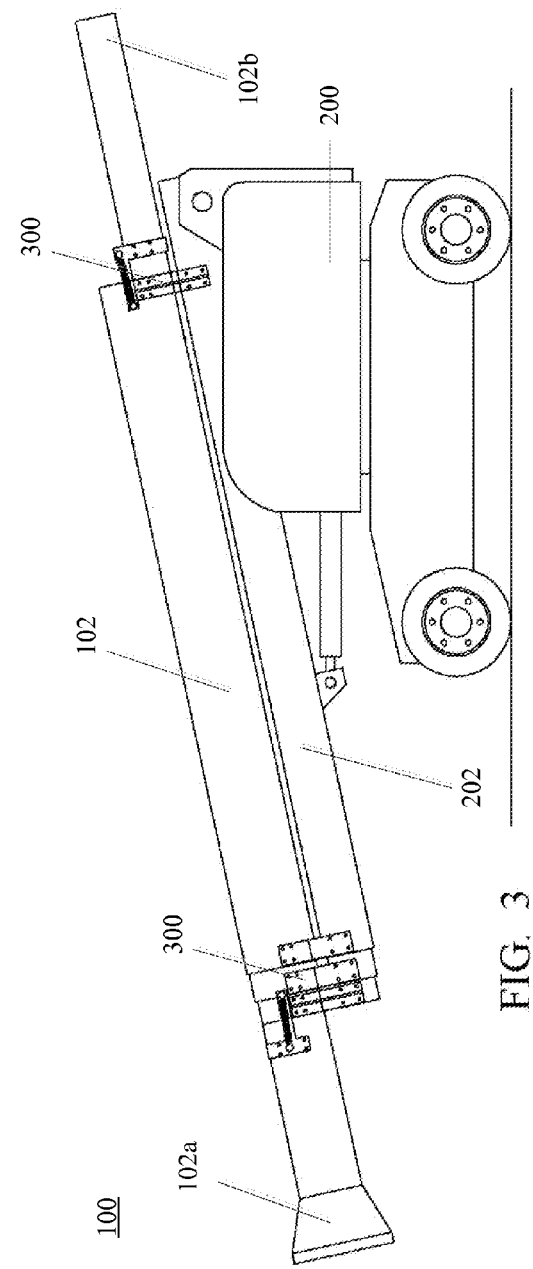
FIG. 2
FIG. 3

APPARATUS FOR FACILITATING ROOFING DEBRIS REMOVAL

CROSS-REFERENCE TO PRIORITY/PROVISIONAL APPLICATIONS

This application claims priority under 35 U.S.C. §119 of U.S. Provisional Application No. 62/033,881, filed Aug. 6, 2014, which is expressly incorporated by reference in its entirety.

BACKGROUND

During repair or replacement of a roof for a commercial or residential structure, debris, such as old shingles, tiles, nails, staples or the like, may be generated. For tall commercial structures, disposal of such debris may be achieved by placing it in a basket located on the roof, using a crane to transport the basket from the roof to the ground, transferring the debris from the basket to a dumpster located on the ground and repeating the process as required. For residential structures, disposal of such debris may be achieved by placing tarps on the ground (e.g., to protect landscaping), throwing the debris from the roof onto the tarps, and transferring the debris from the tarps to a dumpster located in the driveway.

Using a crane and basket for debris removal for tall commercial structures is time consuming due to the slower speed with which cranes must be operated. Further, use of a crane creates injury risks resulting from operation of the crane cabling system that lifts and lowers debris. Using tarps on the ground for receiving debris thrown from the roof of residential structures creates additional debris removal obligations by requiring workers to lift and transfer the debris on the tarps to a dumpster. Such movement may result in debris falling off of the tarp and places additional strain on workers to lift debris items that have already been thrown from roofs. In both examples for tall commercial structures and for residential structures, there is also the injury risk of free falling debris landing on and damaging property and/or causing personal injury.

SUMMARY

An apparatus for facilitating roofing debris removal is disclosed. The apparatus comprises a plurality of slidably connected sections, the plurality of sections forming a structure having a first open end, a second open end, and a channel connecting the first open end and second open end. The apparatus is configured for being connected to a drive mechanism. A first section included in the plurality of sections is configured for being at least substantially received by a second section included in the plurality of sections, the first section configured for telescoping out from the second section when a first force is applied to the apparatus via the drive mechanism, the first section configured for contracting into the second section when a second force is applied to the apparatus via the drive mechanism. The apparatus is configured for receiving debris via the first open end, allowing passage of debris via the channel from the first open end to the second open end, and allowing debris to exit the apparatus via the second open end.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

FIG. 2 is a top view of the apparatus for facilitating roofing debris removal at a work site.

FIG. 3 is a side view of the apparatus for facilitating roofing debris removal at a work site.

FIG. 10-13 provides exemplary brackets that support different shapes of chute sections and connect to an arm segment.

DETAILED DESCRIPTION

Referring generally to FIGS. 1 through 13 (FIGS. 1-13), an apparatus for facilitating removal of debris (e.g., trash) from a roof is described herein. In embodiments, the apparatus 100 may be a chute. For example, the term "chute" as used herein may be defined as a structure having an outer wall which bounds and/or forms a channel down which falling materials are guided. In implementations, the chute 100 may be formed as an elongated tube which is open on both ends. FIGS. 10 through 13 (FIG. 10-13) provides an exemplary set of cross-sectional shapes which the chute 100 may take. For instance, the chute 100 may have and/or may form a circular cross-section. In other examples, the chute 100 may have/form a rectangular cross-section, or any of a number of various other cross-section shape configurations.

In implementations, the chute 100 may be formed of multiple sections 102 which are connected to each other. For instance, one or more of the sections 102 may be configured as enclosed full tube (e.g., full pipe) structures with openings on both ends. In other embodiments, the one or more of the sections 102 may be configured as half tube (e.g., half pipe) structures. In examples, the sections 102 may be slidably connected with respect to each other. In embodiments, the multiple sections 102 may have different dimensions (e.g., diameters) for allowing the sections 102 to be telescopically connected to each other. For example, the sections 102 may be configurable to fit substantially within each other (e.g., incrementally), such as in a nested configuration. For instance, successive sections 102 may be configured to fit within each other (e.g., the sections 102 of the chute 100 may slide within each other, the chute 100 may telescope or slide within itself when contracted/retracted). The telescoping capability of the sections is demonstrated in FIGS. 2, 3, and 5 (FIG. 2-5).

Figure 1:
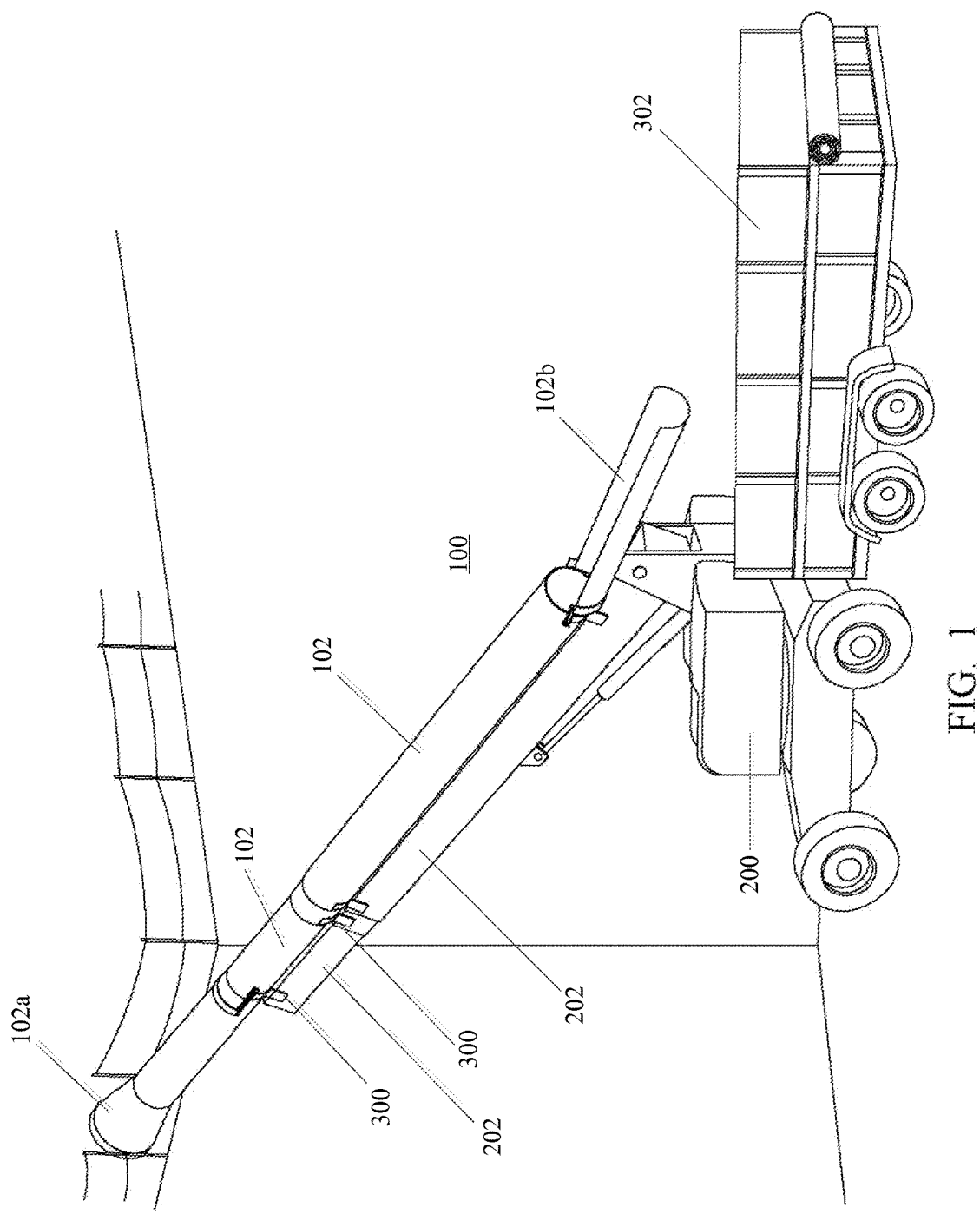
FIG. 1 is a perspective view of the apparatus for facilitating roofing debris removal at a work site.
Figure 4:
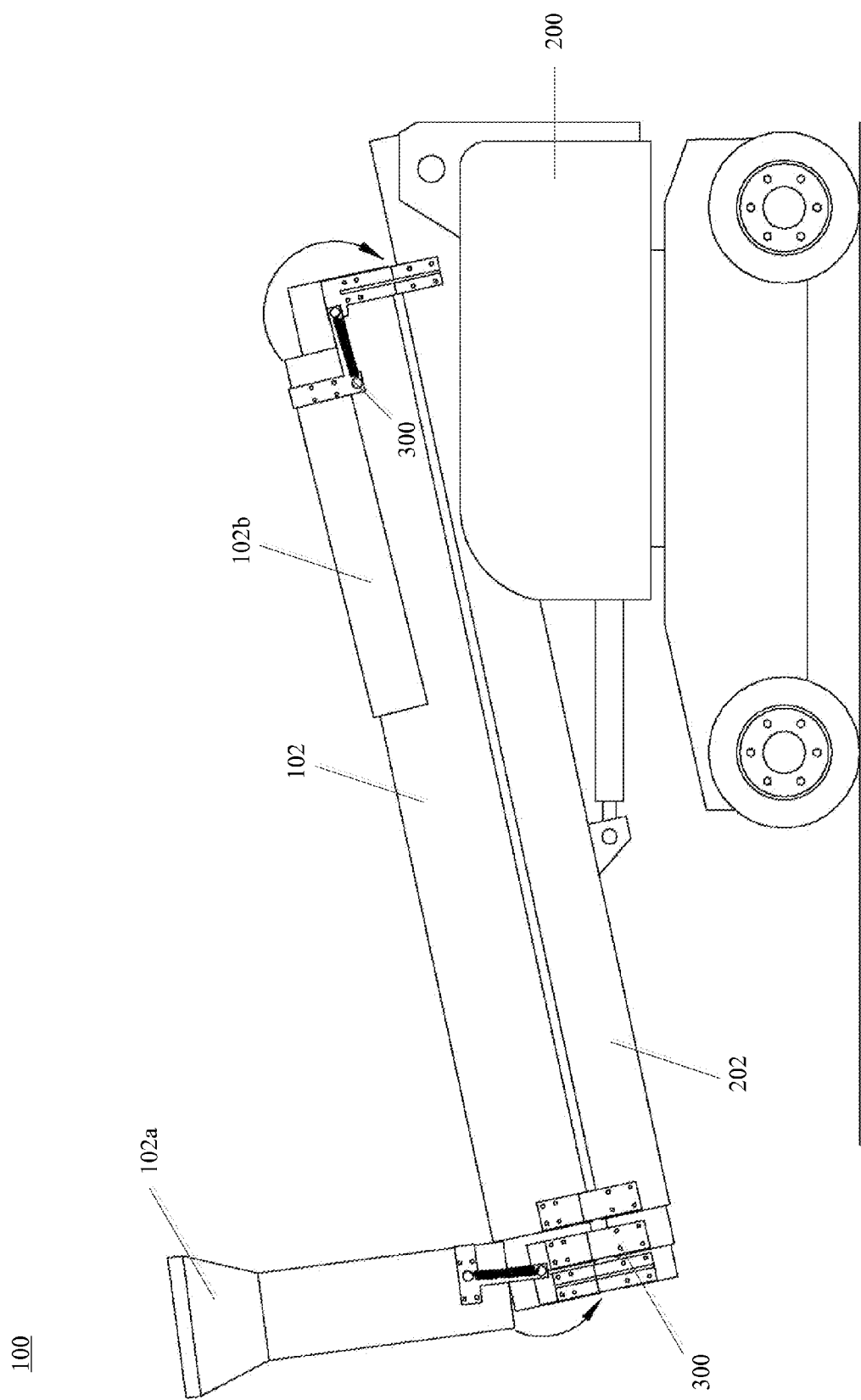
FIG. 4 is a zoomed side view of the apparatus showing an exemplary position of a funnel-shaped open section and an exemplary position of an half-tube open section comprising a chute.
Figure 5:
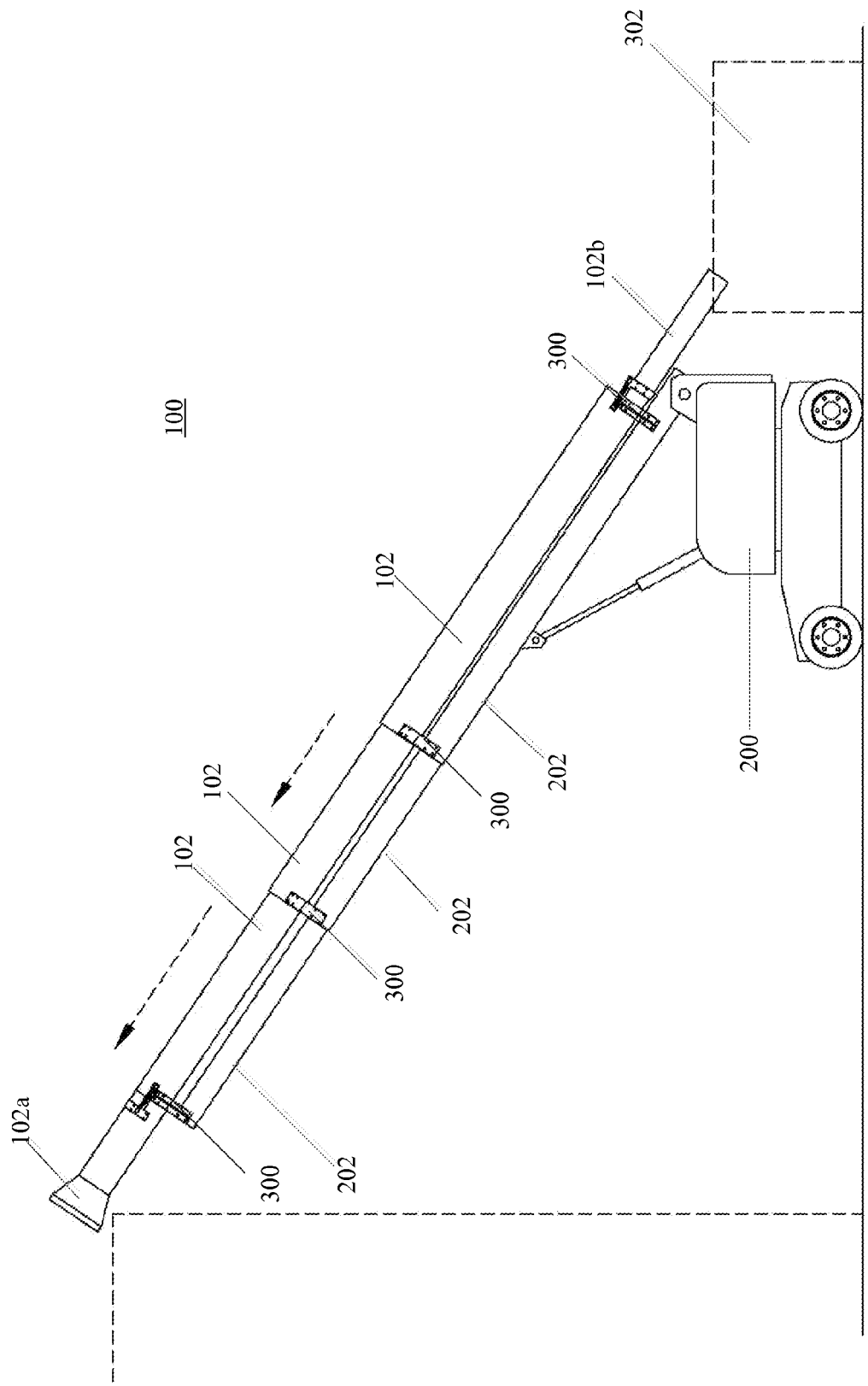
FIG. 5 is a side view of the apparatus with the chute in an extended position.

In examples, one or more sections 102 of the chute 100 may be rotatably (e.g., hingedly) connected with respect to (e.g., relative to) one or more of the other sections 102 for allowing the chute 100 to be collapsible (e.g., foldable), for promoting ease of transport and/or storage of the chute 100. For instance, one or more of the sections 102, such as the end sections (102a and 102b), may be connected (e.g., rotatably connected) to their respective adjacent sections 102 such that they are hingedly connected to those respective adjacent sections. End section 102a (i.e., a first open end) may have a funnel shape or funneling shape for easing the process of guiding debris down the chute 100. Such an end section 102a (e.g., end section 102a in FIG. 8) has a wider opening for initial receipt of debris that narrows to a smaller diameter substantially similar to a pass-through diameter of the chute 100 (i.e., a diameter that each section 102 narrows to when the sections 102 telescopically connected together). End section 102b (i.e., a second open end) may have half-tube shape for reducing the likelihood of debris jamming as it exits the chute 100. The end section 102b (e.g., end section 102b in FIG. 9) may be angled for a receptacle 302 to receive the debris falling off its end or over from either of its sides. In implementations, one or both of the end sections (102a and 102b) may be formed as half-tube or half-pipe structures for facilitating folding of the chute 100. For instance, the end sections (102a and 102b) may be configurable for being folded toward their respective adjacent sections as shown in FIG. 4 (FIG. 4).

In embodiments, the chute 100 may be formed of any of a number of various materials, including, but not limited to: stainless steel, polyvinyl chloride (PVC), aluminum, thermoplastic acrylic-polyvinyl chloride materials, or a combination of two or more of the above. For instance, the chute 100 may be formed of thin-walled stainless steel, for providing a slippery, rust-resistant, abrasion-resistant, relatively light weight (e.g., compared to galvanized steel) structure.

In examples, the chute 100 may be configured for being implemented with (e.g., connected to) an aerial work platform 200. For example, the aerial work platform 200 may be an aerial device, an elevating work platform, a mobile elevating work platform, a mechanized access platform, a boom lift (e.g., a boom, boom system, a man basket boom lift, telescopic boom lift, articulating boom lift, boom truck arm, telescoping support boom, telescoping boom, and/or the like), a scissor lift, or the like. In implementations, the aerial work platform 200 may be powered by any one or more of a number of various methods, such as via hydraulics, pneumatics, gas-powered motors, electric power, and/or the like. Such power may be used for transporting the aerial work platform 200; such power may also (or alternatively) be used for extending and retracting an arm 202 that comprises the work platform 200. In embodiments, the aerial work platform 200 may be a vehicle or may be mounted to a vehicle (e.g., truck) for transporting the aerial work platform 200 between different worksites and/or different locations on a work site. In examples, the aerial work platform 200 may be a self-propelled boom system (e.g., non-hydraulic). FIGS. 1 through 5 (FIG. 1-5) show an exemplary aerial work platform 200.

Figure 7:
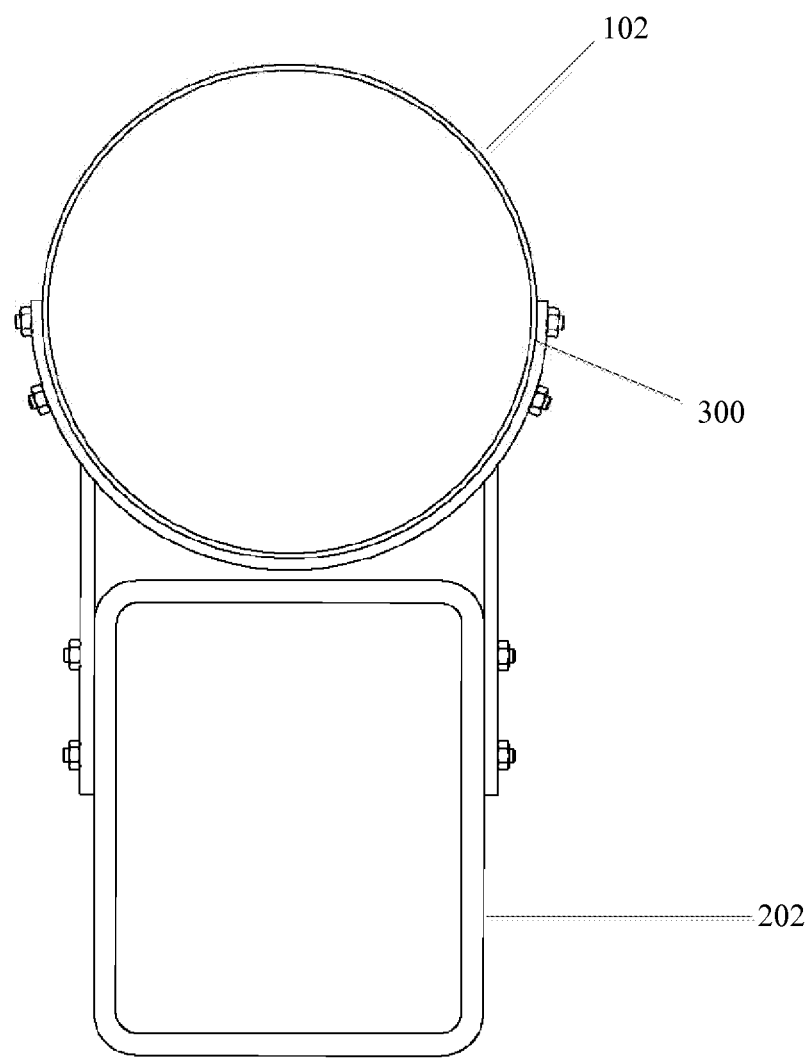
FIG. 7 is a cross-sectional view of the chute and arm comprised of a chute section and an arm segment.
Figure 8:
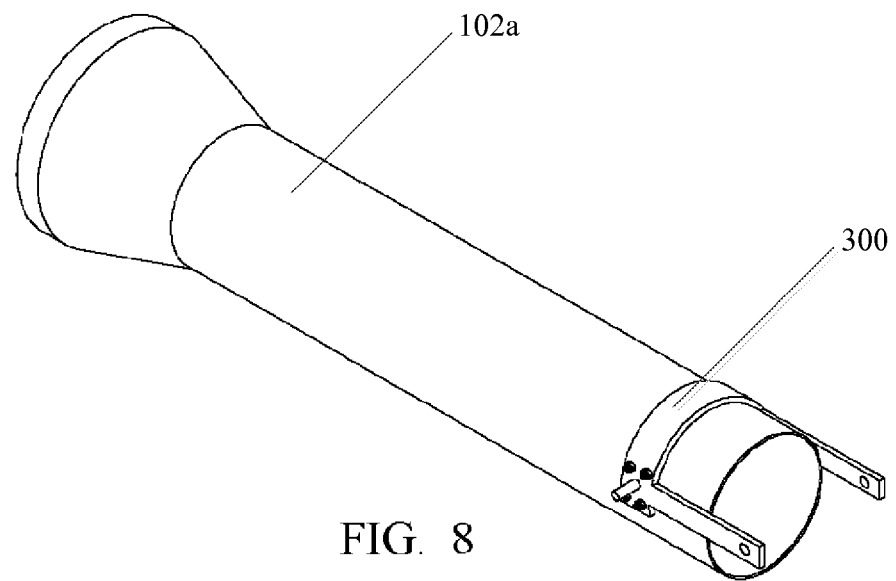
FIG. 8 is a perspective view of a funnel-shaped open section.
Figure 9:
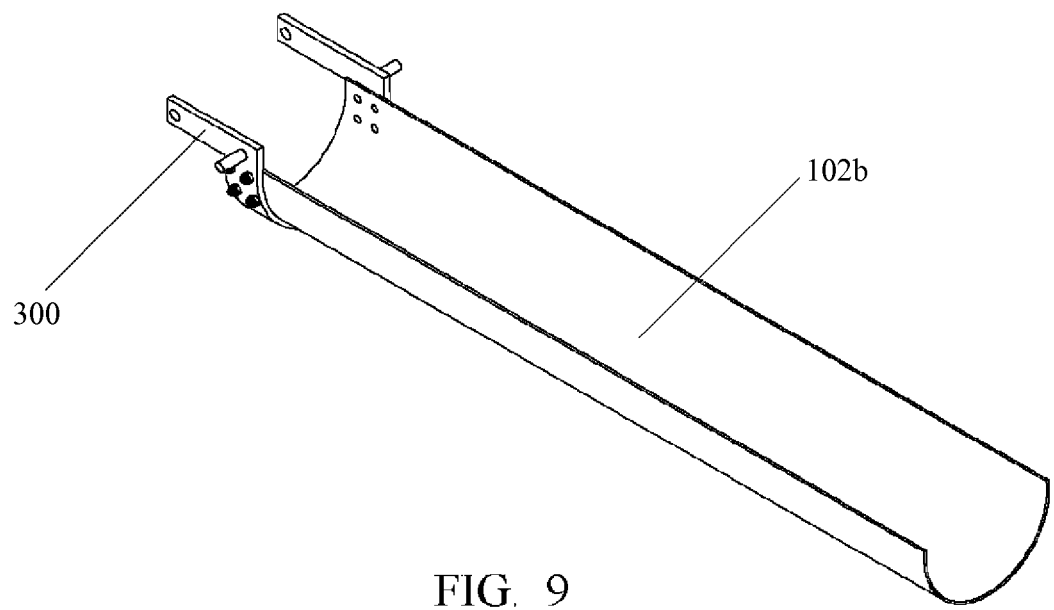
FIG. 9 is a perspective view of an half-tube open section.
Figure 10:
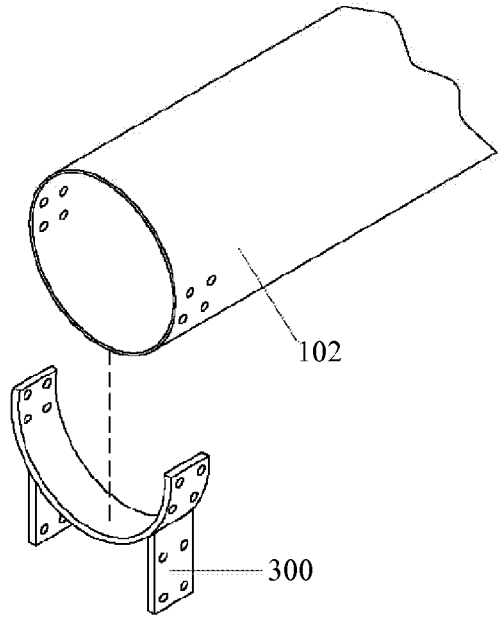
Figure 11:
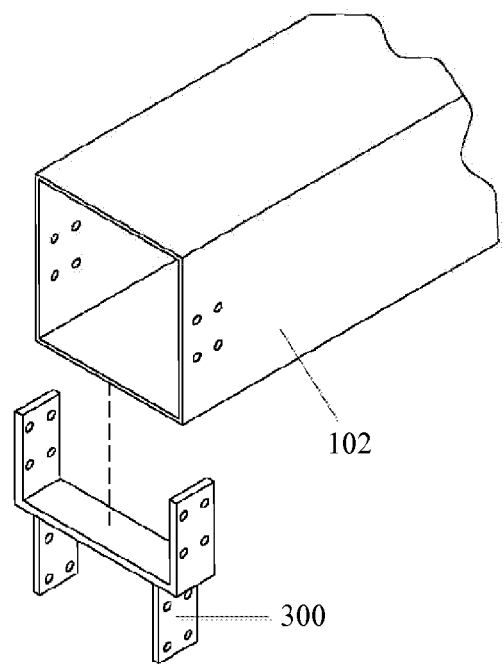
Figure 12:
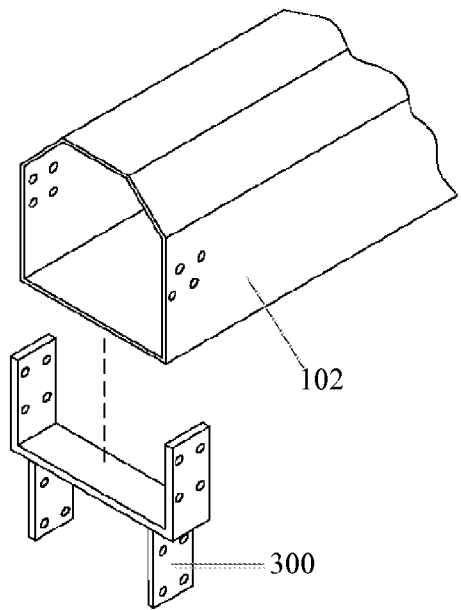
Figure 13:
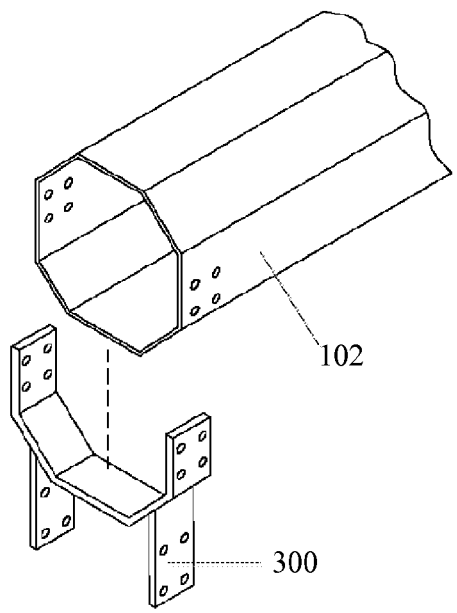

In implementations, one or more connectors (e.g., support brackets) 300 may be used for connecting the chute 100 to (e.g., mounting the chute 100 upon) the aerial work platform 200. For example, the chute 100 may be connected to (e.g., supported upon) an arm (e.g., telescoping arm, boom truck arm) 202 of the aerial work platform 200 via the support brackets 300. In examples, the support brackets 300 may be sized and shaped for allowing the chute 100 to be seated upon (e.g., at least substantially within) the support brackets. For instance, as seen in FIGS. 7 and 10 (FIG. 7 and FIG. 10), the support brackets 300 may generally have a half-circle or U-shaped configuration for accommodating a correspondingly tube-shaped chute 100. Examples of other accommodations are seen in FIGS. 11 through 13 (FIG. 11-13), where the chute 100 has a cross-section that is (for example) square or rectangular, hexagonal, or octagonal. In implementations, the support brackets 300 may be connected to the chute 100 and/or to the arm 202 of the aerial work platform 200. For example, any one or more of a number of various fasteners or securing mechanisms may be used for connecting (e.g., securing) the support brackets 300 to the chute 100 and/or to the arm 202 of the aerial work platform 200.

Figure 6:
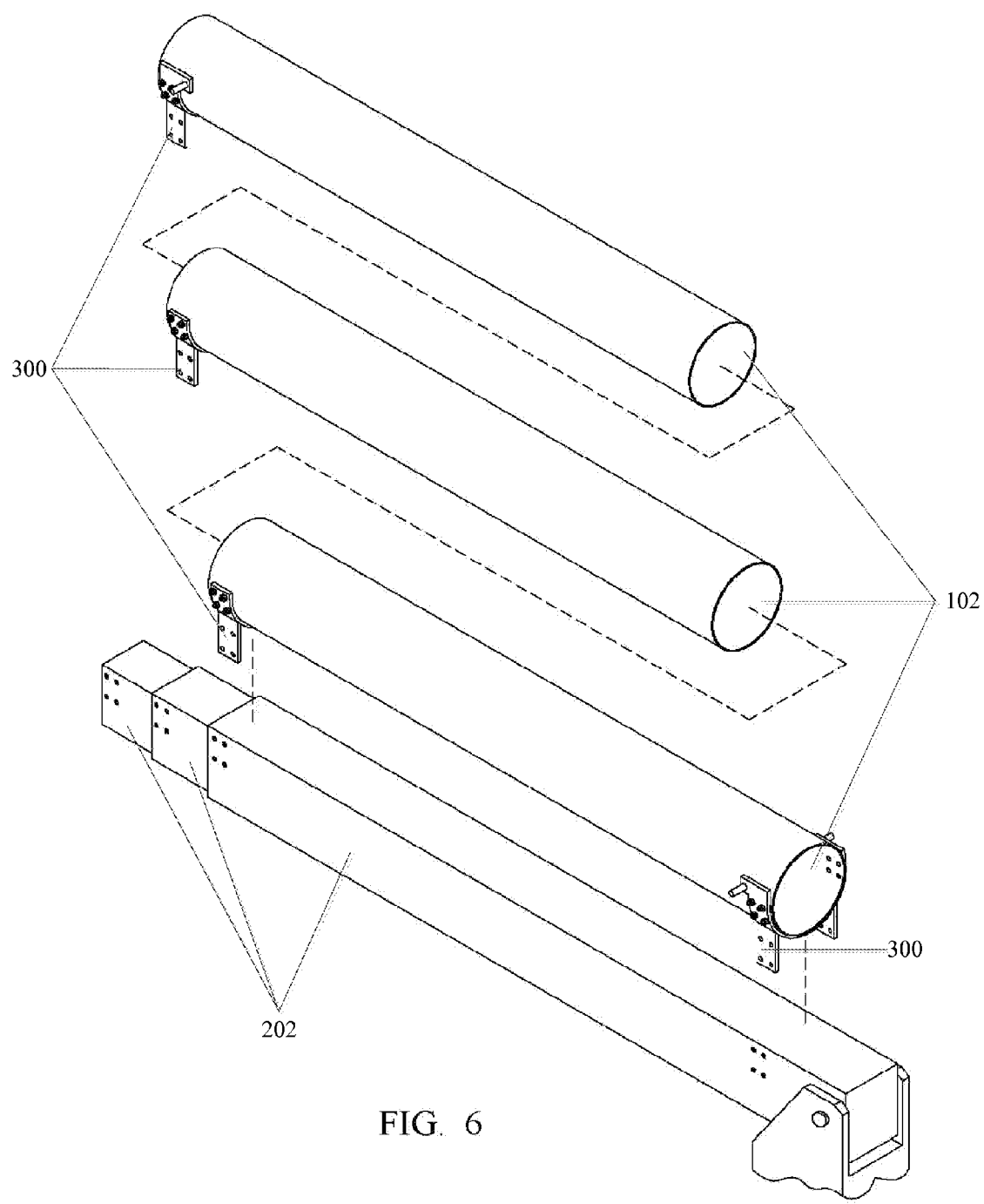
FIG. 6 is an exploded view of an exemplary configuration for the chute.

In embodiments, the connection between the chute 100 and the arm 202 via the support brackets 300 is configured such that the chute 100 telescopes (e.g., extends) and retracts when the arm 202 telescopes and retracts. For example, analogous to the chute 100, the arm 202 may include a plurality of segments 204, which are sized and shaped to fit within each other in a nested configuration (as seen in FIG. 6). In implementations, as the arm 202 extends and retracts (e.g., via activation of the hydraulic mechanism of the aerial work platform 200), the chute 100 also extends and retracts respectively, such that said extension of the chute 100 occurs concurrently with the extension of the arm 202, and said retraction of the chute 100 occurs concurrently with the retraction of the arm 202 (e.g., the chute 100 slides within itself/contracts when as the arm 202 contracts/retracts). In embodiments where arm 202 is a telescopic arm, the support brackets 300 may be positioned incrementally along the length of the chute 100 and/or arm 202, such that during extension and refraction of the chute 100 and arm 202, the support brackets 300 are moved away from each other (e.g., during extension of the chute 100 and arm 202) and collapsed toward each other (e.g., during retraction/contraction of the chute 100 and arm 202) respectively in a same general direction (e.g., along a same axis) as the chute 100 and arm 202. Similarly, in embodiments where arm 202 is a boom arm, the chute 100 may extend or contract with the arm 202 (e.g., as directed by the boom arm) such that it may be positioned at, directed to (e.g., extended up to, contracted down to), established at, and/or maintained at a desired height, as dictated by a user of the aerial work platform 200 and chute 100.

In implementations, the arm 202 and chute 100 may be directed (e.g., extended) upward so that a first end section (e.g., top end section) 102a of the chute 100 may extend (e.g., telescope) away from the second end section (e.g., bottom end section) 102b of the chute 100. The arm 202 and chute 100 may be extended in such manner until the first end section 102a is established in a position which is proximal to an elevated work area (e.g., roof, edge or window of a building/house). For example, the mechanism (e.g., hydraulics) for causing extension of the arm 202 may be controlled by a person located on the ground who is operating the aerial work platform 200, such that it may be activated (e.g., powered on) to extend the arm 200 and thus, the chute 100 and then de-activated (e.g., powered off) once the arm 202 and first end section 102a of the chute 100 are located at a desired height or position. This allows for workers who are located in the elevated work area to have access to the first end section 102a of the chute 100 so that they may take debris located in the elevated work area and direct it into the chute 100 via the open end of first end section 102a. The first end section 102a may be configured (e.g., sized, shaped) for being easily accessible for receiving debris and directing debris into (e.g., down) the chute 100. When the first end section 102a of the chute is proximal to the roof or window, the second end section 102*b* of the chute 100 may be proximal to a base of the aerial work platform 200 and also proximal to a garbage receptacle 302 (e.g., dumpster) located on the ground, such that debris being directed through (e.g., falling down) the chute 100 may exit the opening of the second end section 102*b* of the chute 100 and be expelled directly into the garbage receptacle 302 (seen in FIGS. 1 and 5). In this way, the chute 100 described herein promotes safety by obviating the need to throw debris directly from the roof onto tarps located on the ground. Likewise, the chute 100 described herein promotes efficiency by obviating the scenario in which debris would have to be thrown from the roof onto tarps located on the ground and then gathered up from tarps and transferred to a dumpster. When used in residential situations (e.g., re-roofing of houses), the chute 100 described herein promotes convenience in that damage to landscaping can be avoided or greatly reduced by not having to use the aforementioned tarps. Further, because the chute 100 may be implemented with an aerial work platform 200, given the maneuverability and reach of the arm 202 of the aerial work platform, the chute 100 further promotes convenience in that the chute 100 may be positioned such that debris can be directly deposited from a rooftop into a dumpster located on the ground, via the chute 100, without having to have the dumpster be located in close proximity to (e.g., up against) the building/house.

In examples, the chute 100 is sized and shaped for allowing various types of debris (e.g., shingles, boards, bricks, etc.) to easily fit within and traverse through the channel formed by the chute 100, such that it may easily be directed into and exit from the chute 100. For example, the chute 100 may be linearly-shaped, as opposed to being bent or curved, for promoting ease of movement of debris (e.g., long, straight objects) through the chute 100.

Depending upon the type of aerial work platform 200 being used, the chute 100 may be easily re-positioned from a first elevated work area at a first location to a second elevated work area at a second location, such as by moving (e.g. pivoting) the arm 202 or re-locating the entire aerial work platform 200. In this manner, the chute 100 can be easily relocated from work area to work area, such as along the side of a building, with the dumpster being correspondingly relocated for catching debris expelled from the chute 100. Further, the chute 100 described herein promotes efficiency and cost-effectiveness by obviating the need to do the following: place debris in a basket located on the roof; use a crane to move the basket from the roof to a dumpster on the ground; empty the debris from the basket; use the crane to move the basket back up to the roof; and repeat the cycle.

In embodiments, the chute 100 is adaptable for implementation in residential scenarios (e.g., when re-roofing a house). For example, the chute 100 and aerial work platform 200 may be connected to (e.g., supported upon, mounted on) and sized for use upon a mobile platform (e.g., trailer) which a user may back into a driveway. Further, in some embodiments (e.g., some residential use embodiments), the chute 100 and arm 202 of the aerial work platform 200 may be driven (e.g., extended, contracted) via a self-propelled (e.g., electric) boom system. Further, when not in use, the chute 100 and/or arm 202 may be configured for being received in a cradle located on the trailer. The trailer may then be hooked back up to a vehicle (e.g., truck) and transported from the job site.

In examples, the size and style of the chute 100 may vary. For instance, the chute 100 may be self-contained on a driveable, rotating base power unit. In other embodiments, the chute 100 may be configured in a manner similar to a telescoping fire ladder, but with no roller systems. In implementations, the chute 100 may be configured (e.g., constructed, sized) for allowing large objects (e.g., persons) to fit inside of and traverse through the chute 100. In such an implementation, the chute 100 may be used as a fire evacuation slide, with the second (e.g., bottom) end 102 of the chute 100 may be aligned with an inflatable catch bag on the ground. Further, the chute 100 may provide for a controlled slide to a level less than six feet off of the ground. The controlled slide may promote elimination of fall exposure according to federal regulatory (e.g., Occupational Safety and Health Administration (OSHA)) standards, since if someone were to accidentally go down the chute 100, this may not technically constitute a "fall". In embodiments, the chute 100 may be configured with and/or may be configured into a slightly bent, curved or angled configuration, so as to provide an eased (e.g., gradual) transition from the elevated work area to the ground for persons using the chute 100 as a fire evacuation mechanism. Further, the chute 100 may be configured as substantially enclosed, which may promote safety by retaining debris within the chute 100, thereby preventing it from falling onto persons located below the chute 100.

In one or more embodiments, the chute 100 may be configured for use with different drive mechanisms for extending and contracting the chute 100, aside from those drive mechanisms that are used with aerial work platforms 200. In implementations, the chute 100, due to its telescoping construction, is self-cleaning when it retracts.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
 a plurality of slidably connected sections, the plurality of sections forming a structure having
 a first open end, wherein
  the first open end is funnel shaped and the first open end is hingedly connected to an adjacent section,
 a second open end, and
 a channel connecting the first open end and the second open end, the apparatus configured for being connected to a drive mechanism, a first section included in the plurality of sections is configured for being at least substantially received by a second section included in the plurality of sections, the first section configured for telescoping out from the second section when a first force is applied to the apparatus via the drive mechanism, the first section configured for contracting into the second section when a second force is applied to the apparatus via the drive mechanism,
 wherein the apparatus is configured for receiving debris via the first open end, allowing passage of the debris via the channel from the first open end to the second open end, and allowing the debris to exit the apparatus via the second open end.

2. The apparatus of claim 1, wherein the drive mechanism is an aerial work platform.

3. The apparatus of claim 2, wherein the aerial work platform comprises an arm having a plurality of slidably connected segments, where each segment of the plurality of segments is connected to a section from the plurality of sections through a support bracket.

4. The apparatus of claim 2, wherein the aerial work platform is mounted to a vehicle for transporting the apparatus from one work site to another.

5. The apparatus of claim 1, wherein the second open end is half-tube shaped.

6. The apparatus of claim 1, wherein the second open end is hingedly connected to a second adjacent section.

7. The apparatus of claim 1, wherein the channel is enclosed.

8. The apparatus of claim 1, wherein the apparatus is connected to the drive mechanism by one or more support brackets configured to receive the channel.

9. The apparatus of claim 8, wherein the channel has a cross sectional shape that is substantially a hexagon.

10. The apparatus of claim 8, wherein the channel has a cross sectional shape that is substantially a circle.

11. An apparatus, comprising:
a plurality of slidably connected sections, the plurality of sections forming a structure having a first open end, wherein
the first open end is funnel shaped, and the first open end is hingedly connected to a first adjacent section,
a second open end, wherein
the second open end is half-tube shaped, and the second open end is hingedly connected to a second adjacent section,
a channel connecting the first open end and second open end, and
a drive mechanism,
wherein a first section included in the plurality of sections is configured for being at least substantially received by a second section included in the plurality of sections, the first section configured for telescoping out from the second section when a first force is applied to the apparatus via the drive mechanism, the first section configured for contracting into the second section when a second force is applied to the apparatus via the drive mechanism,
wherein the apparatus is configured for receiving debris via the first open end, allowing passage of the debris via the channel from the first open end to the second open end, and allowing the debris to exit the apparatus via the second open end.

12. The apparatus of claim 11, wherein the drive mechanism is a boom lift.

13. The apparatus of claim 12, wherein the the boom lift comprises an arm having a plurality of slidably connected segments, and each segment of the plurality of segments is connected to a section from the plurality of sections through a support bracket.

14. The apparatus of claim 12, wherein the boom lift is mounted to a non-motorized vehicle for transporting the apparatus from one work site to another.

15. The apparatus of claim 11, wherein the channel is enclosed.

16. The apparatus of claim 11, wherein the apparatus is connected to the drive mechanism by one or more support brackets configured to receive the channel.

17. The apparatus of claim 16, wherein the channel has a cross sectional shape that is substantially a hexagon.

18. The apparatus of claim 16, wherein the channel has a cross sectional shape that is substantially a circle.

* * * * *